United States Patent [19]

Haldeman

[11] 4,396,513
[45] Aug. 2, 1983

[54] USE OF VERY HIGH CHARGE CATIONIC POLYMERS IN BIOLOGICAL SLUDGE DEWATERING

[75] Inventor: David R. Haldeman, Morrisville, Pa.

[73] Assignee: Betz Laboratories, Inc., Trevose, Pa.

[21] Appl. No.: 300,145

[22] Filed: Sep. 8, 1981

[51] Int. Cl.³ .......................................... C02F 11/14
[52] U.S. Cl. .................................... 210/734; 210/747
[58] Field of Search ............... 210/609, 725, 727, 728, 210/733, 734, 400, 401, 747

[56] References Cited

U.S. PATENT DOCUMENTS

| | | | |
|---|---|---|---|
| 3,023,162 | 2/1962 | Fordyce et al. | 210/734 |
| 3,278,506 | 10/1966 | Chamot et al. | 210/734 |
| 3,336,269 | 8/1967 | Monagle et al. | 526/212 |
| 3,336,270 | 8/1967 | Monagle | 526/212 |
| 3,414,514 | 12/1968 | Buhl | 210/734 |
| 3,725,312 | 4/1973 | Panzer et al. | 210/736 |
| 3,852,249 | 12/1974 | Miyabe et al. | 525/328 |
| 4,009,201 | 2/1977 | Steckler et al. | 526/260 |
| 4,030,970 | 6/1977 | Tominaga et al. | 162/177 |
| 4,076,663 | 2/1978 | Masuda et al. | 525/54.31 |
| 4,105,558 | 8/1978 | Heinrich et al. | 210/401 |
| 4,115,331 | 9/1978 | Tominaga et al. | 260/29.6 TA |
| 4,144,212 | 3/1979 | Linder et al. | 260/29.7 H |
| 4,152,307 | 5/1979 | Shibahara et al. | 210/734 |

FOREIGN PATENT DOCUMENTS

| | | | |
|---|---|---|---|
| 1199412 | 7/1970 | United Kingdom | 210/609 |
| 1341971 | 12/1973 | United Kingdom | 210/734 |
| 1388399 | 3/1975 | United Kingdom | 210/734 |

Primary Examiner—Peter A. Hruskoci
Attorney, Agent, or Firm—Alexander D. Ricci; Bruce E. Peacock

[57] ABSTRACT

A method of dewatering bio-sludge is disclosed. This method comprises adding to the sludge, an effective amount for the purpose of an acrylamide/dimethylaminoethylmethacrylate methylchloride copolymer having a cationic charge density of 90%.

9 Claims, 8 Drawing Figures

USE OF VERY HIGH CHARGE CATIONIC POLYMERS IN BIOLOGICAL SLUDGE DEWATERING

FIELD OF THE INVENTION

The present invention pertains to the use of a particular copolymer treatment, comprising an acrylamide monomer and a monomer comprising a quaternary ammonium salt of N,N-dimethylaminoethylmethacrylate, having a cationic charge density of about 90 mole %, as a bio-sludge dewatering aid.

BACKGROUND OF THE INVENTION

With the increased emphasis on the control of air and water pollution, mechanical methods of sludge dewatering have become an essential part of water treatment processes. No longer can untreated sludge simply be dumped into the nearest river, lagoon or vacant lot. With this increased environmental concern, sludge concentrating, and dewatering techniques have been given ever increasing emphasis in industry.

Sludge dewatering processes, which include vacuum filtration, centrifugation, lagoon and gravity cell dewatering, date back to the early 1800's. Sludge dewatering is not a simple, quick process. In sludge handling facilities, problems encountered in the dewatering process include high moisture cake formation, poor cake release from dewatering equipment, high disposal costs, slow dewatering and poor equipment efficiency.

Sludge dewatering can lead to increased savings, especially with respect to transportation costs associated with sludge disposal. Even small decreases in the sludge moisture content can result in significant economic benefits.

Sludge is almost always given primary dewatering treatment before discharge from any given process system. Primary dewatering is usually accomplished using thickener/clarifiers or settling ponds. Secondary dewatering, including vacuum filtration, centrifugation, belt filters, lagoons, etc., are then commonly employed to further increase the solids content, so that the resulting sludge comprises only about 40-80% liquid.

In certain instances, sludge conditioning agents, commonly polyelectrolytes, may be added to the sludge to aid in the production of a drier cake, and to reduce wear and tear on dewatering equipment.

U.S. Pat. No. 3,414,514 (Buhl) discloses sludge dewatering processes comprising contacting the sludge with acrylamide-beta methacrylyloxyethyltrimethylammonium methyl sulfate (MTMMS) copolymer. It is stated therein that the copolymer consists by weight of 99%-20% acrylamide and 1-80% MTMMS. Preferred monomer ratios given in the patent are 97%-50% acrylamide and 30-50% MTMMS.

In U.S. Pat. No. 4,152,307 (Shibahara et al), certain water in oil polymer emulsions are disclosed as being "useful in waste water treatments". Specifically, the emulsions are formed by dispersing from 30-70% by weight of an aqueous solution of an ethylenically unsaturated (hydrophilic) monomer and 70 to 30% by weight of a hydrophobic organic liquid in the presence of a surfactant, and then polymerizing the resultant dispersion to obtain a suitable water in oil emulsion. The ethylenically unsaturated monomer may be used in conjunction with another hydrophilic monomer. Included within the scope of this broad disclosure, as being useful hydrophilic monomers, are, inter alia, 2-(meth)acryloyloxyethyltrimethyl ammonium chloride [which may also be referred to as dimethylaminoethyl methacrylate methylchloride] and acrylamide.

Other patents which may be of interest include U.S. Pat. Nos. 3,336,269 (Monagle et al) and 3,336,270 (Monagle). These disclosures pertain, inter alia, to preparatory routes for acrylamide type water soluble polymers in general and detail the preparation of acrylamide/vinyl quaternary ammonium salt copolymers, such as beta-methacryloyloxyethyltrimethyl ammonium methyl sulfate/acrylamide copolymers. Another patent related to the general field of flocculation is U.S. Pat. No. 3,278,506 (Chamot et al).

In contrast to the prior art disclosures, I have found that a very high cationic charge density copolymer is surprisingly effective as a biosludge dewatering agent. Specifically, my invention pertains to a copolymer having about a 80-90% cationic charge density. The cationic monomer is a quaternary ammonium salt of 2-(meth)acryloyloxyethyl-N,N-dimethylamine. This specific cationic monomer is copolymerized with acrylamide in a molar ratio of about 80-90% cationic monomer: 20-10% acrylamide.

DESCRIPTION OF THE INVENTION

As used throughout the specification and claims, the term "biosludge" is used to indicate any organic sludge that has been treated to increase biological growth therein. Commonly, such treatment techniques include activated sludge processes or fixed film type reactors. The organic sludge may, without limitation, be generated from sewage plants, and/or industrial waste treatment plants, including chemical, petrochemical, or paper treatment plants.

The specific copolymer which has proven to be most effective as a bio-sludge dewatering aid has the structure

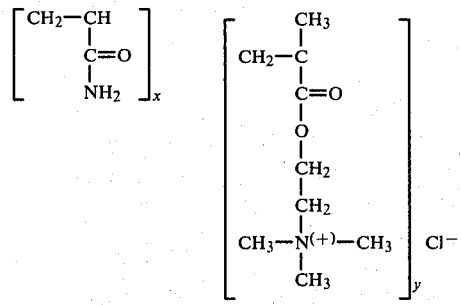

wherein x=about 10-20 mole % and y=about 90-80 mole %.

These polymers may be prepared via precipitation polymerization, as detailed in U.S. Pat. No. 3,414,514. Basically, the process disclosed in said patent comprises polymerizing a solution of an acrylamide monomer and a quaternary ammonium salt of 2-(meth)acryloyloxyethyl-N,N-dimethylamine monomer in aqueous tertiary butanol, aqueous acetone or aqueous tertiary butanol-acetone in the substantial absence of air while agitating the solution to give a copolymer product that can be isolated by filtration. The aqueous tertiary butanol and aqueous acetone are solvents for the monomers but are nonsolvents for the resulting product.

This polymerization procedure may be carried out in the presence of a free radical initiator of the type well known in the art. In this respect, peroxygen compounds or -azo-bis-isobutyronitrile may be mentioned as possible initiators. Precipitation may be carried out in a buffer system.

Another preparative route, comprising utilization of a redox system in conjunction with a potassium persulfate catalyst and benzene solvent is reported in Example 5 of U.S. Pat. No. 3,278,506, the entire disclosure of this patent being incorporated by reference herein.

Prior to polymerization, the 2-(meth)acryloyloxyethyl-N,N-dimethylamine compound is quaternized in accordance with procedures well known to those skilled in the art. Although the use of a methyl chloride quaternizing agent is presently preferred, other known quaternizing compounds, such as dimethyl sulfate, ethyl chloride, ethylene oxide or other alkylene oxides and the like, and benzl chloride are also suitable.

The resulting copolymer, in accordance with the invention, will have a cationic charge density (based upon the molar ratio of monomers) of about 80 to about 90%, with 90% being the preferred cationic charge density.

One specific copolymer, in accordance with the invention, is presently sold by Sanyo Chemical Co. under the trademark "Sanfloc". The molecular weight of this copolymer is thought to be between about 1-2 million. The cationic charge density of this copolymer is about 90%. The copolymer is acrylamide/dimethylaminoethylmethacrylate methyl chloride.

The copolymer treatment is added to the desired bio-sludge in an amount of between about 5-50 lbs copolymer per ton dry sludge solids. Preferably, the copolymer is added within a range of about 5-10 lbs per ton of dry sludge solids.

The treatment may be added directly to the biosludge after it has been clarified, or it can be added after the sludge has been subjected to a thickener, digester or the like, prior to other dewatering processes, which may include belt filters, vacuum filters, centrifuges, lagoons, etc.

Based upon presently available experimental data, this particular dewatering aid has proven to be especially effective as a conditioning agent in belt filter dewatering applications as it produces a very large floc and does not tend to adhere to the filter cloth.

BRIEF DESCRIPTION OF THE DRAWINGS

The appended drawings graphically present the data generated by the examples which are reported hereinbelow. In the drawings.

EXAMPLES

The invention will now be further described with respect to the following examples of specific embodiments. These examples are illustrative only, and should not be construed as limiting the invention.

One widely used method of determining the relative effectiveness of polymer treatments in sludge dewatering cases is known as the Buchner Funnel Test. This test permits recordation of the time required to filter a given amount of filtrate volume for any particular polymer treatment dosage. Data is best interpreted by plotting the time needed to collect a certain filtrate volume vs. specific polymer dosages. Generally, the lowest dosage giving a low time value is optimum.

To perform this test, a Whatman #4 filter is first placed in the Buchner funnel and is wetted to insure a proper seal. The funnel and filter are placed atop a 500 ml graduated buret. A vacuum source is operatively connected to the buret and is set to the desired negative pressure.

200 ml of sludge are placed into a 400 ml beaker. The desired amount of the polymeric dewatering treatment is then added, and the sludge-polymer mixture is mixed via utilization of a three-bladed propeller stirrer. The vacuum is then actuated, and the sludge-polymer sample is poured into the Buchner funnel. At this moment, an observer starts a stopwatch and records the time needed to produce a predetermined amount of filtrate.

Example 1

Figure 1:
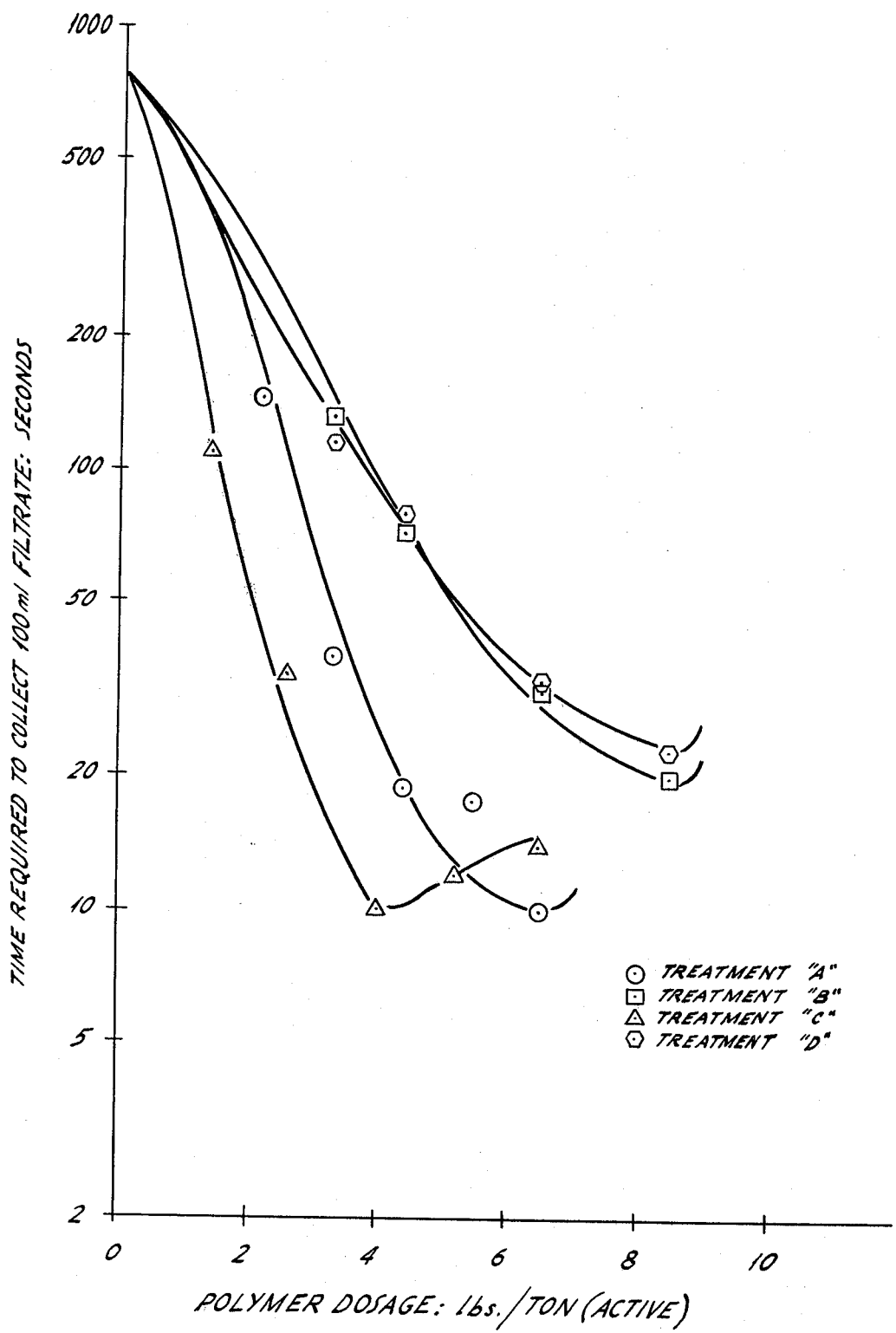
FIG. 1 is a graph showing the time needed to collect 100 ml of filtrate from the conditioned sludge samples tested in Example 1.

Bio-sludge obtained from a mid-western location was subjected to the Buchner Funnel Test. Four different polymer treatments were tested. The results have been plotted and appear in graphical form in FIG. 1. The data used to generate the graph appears below in Table I.

TABLE I

| Treatment | Polymer Dosage lbs/ton- Active | Time to Collect (Seconds) | | | |
| --- | --- | --- | --- | --- | --- |
| | | 25 ml | 50 ml | 75 ml | 100 ml |
| A | 2.2 | 8 | 32 | 71 | 145 |
| | 3.3 | 3 | 10 | 21 | 37 |
| | 4.4 | 2.5 | 5 | 10 | 19 |
| | 5.4 | 3 | 7 | 13 | 18 |
| | 6.5 | 2 | 4 | 7 | 10 |
| B | 3.3 | 9 | 36 | 77 | 130 |
| | 4.4 | 5 | 17 | 37 | 72 |
| | 6.5 | 3 | 8 | 18 | 31 |
| | 8.7 | 4 | 8 | 13 | 20 |
| C | 1.1 | 7 | 28 | 64 | 110 |
| | 2.2 | 3 | 9 | 19 | 34 |
| | 3.3 | 2 | 4 | 7 | 10 |
| | 4.4 | 2 | 4 | 8 | 12 |
| | 5.4 | 3 | 6 | 9 | 13 |
| D | 3.3 | 8 | 30 | 74 | 119 |
| | 4.4 | 5 | 18 | 41 | 80 |
| | 6.5 | 3 | 9 | 19 | 32 |
| | 8.7 | 3 | 7 | 13 | 23 |

Test Conditions 200 ml sludge volume
Mixing 10 sec at 400 rpm.

Polymer Concentration=0.25% Actives
Vacuum=12.5 in Hg.
Filter=Whatman #4
Solids=2.30%
pH=5.88
The polymers used for these tests were as follows:

(1) Treatment "A"=acrylamide/dimethylaminoethylmethacrylate methylchloride copolymer having the following structure

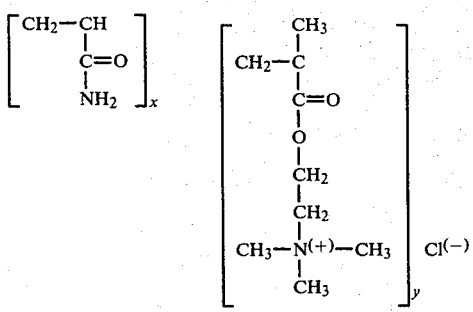

Wherein y=90 mole %.
Wherein x=10 mole %.
Treatment "A" is commercially available from Sanyo Chemical Co. under the trademark "Sanfloc", with an intrinsic viscosity of 5.38 dl/g @ 30° C. in 1 M NaCl.

(2) Treatment "B"=same structure as "A"; but wherein y=60 mole % and x=40 mole %, also available from Sanyo Chemical Co.

(3) Treatment "C"=aminomethylated polyacrylamide, with an intrinsic viscosity of 3.73 dl/g @ 30° C. in 1 M NaCl. Structure=

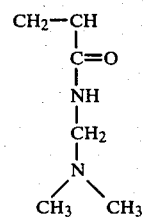

(4) Treatment "D"="Percol 757"=same structure as "A"; but wherein y=60 mole % and x=40 mole %, available from Allied Colloids, Inc., having an intrinsic viscosity of 8.00 dl/g @ 30° C. in 1 M NaCl.

Example 2

Figure 7:
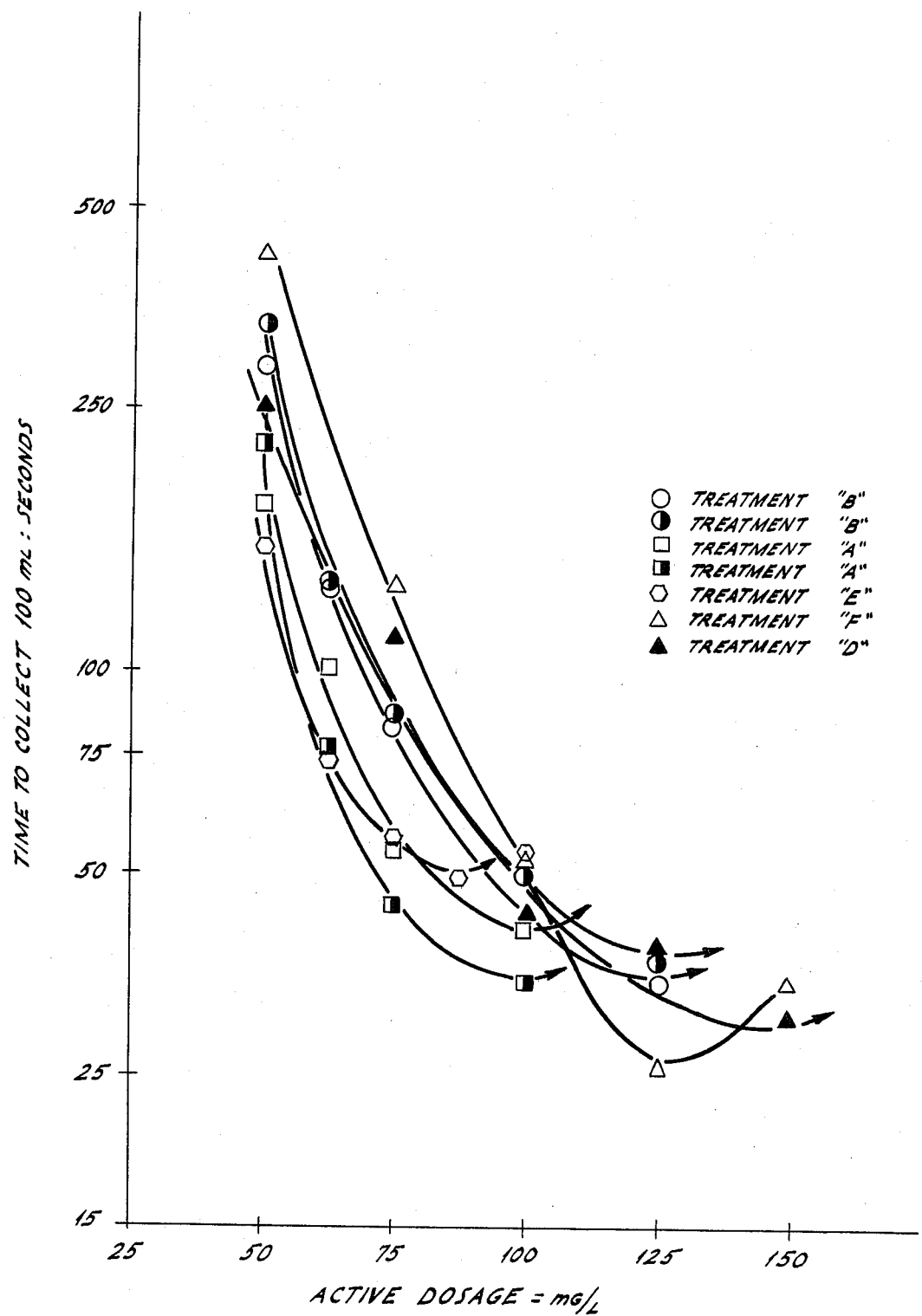
FIG. 7 is a graph showing the time needed to collect 100 ml of filtrate from the conditioned sludge samples tested in Example 2.

Bio-sludge obtained from an eastern Pennsylvania location was subjected to the Buchner Funnel Test. Seven polymer treatments were tested. The results which appear below in Table II have been plotted and appear in graphical form in FIG. 7.

TABLE II

| Treatment | Polymer Dosage mg/L-Active | Time to Collect 100 ml (seconds) | Treatment | Polymer Dosage mg/L-Active | Time to Collect 100 ml (seconds) |
|---|---|---|---|---|---|
| A | 50 | 180 | E | 50 | 155 |
|  | 62.5 | 105 |  | 62.5 | 74 |
|  | 75 | 55 |  | 75 | 58 |
|  | 100 | 42 |  | 87.5 | 50 |
|  | 125 | Overdose |  |  |  |
| A (Second trial run) | 50 | 220 | F | 50 | 430 |
|  | 62.5 | 77 |  | 75 | 137 |
|  | 75 | 45 |  | 100 | 53 |
|  | 100 | 35 |  | 125 | 26 |
|  | 125 | Overdose |  | 150 | 35 |
| B | 50 | 285 | D | 50 | 250 |
|  | 62.5 | 135 |  | 75 | 115 |
|  | 75 | 85 |  | 100 | 45 |
|  | 100 | 55 |  | 125 | 40 |
|  | 125 | 35 |  | 150 | 31 |
| B (Second trial run) | 50 | 335 | Blank | — | 7500 |
|  | 62.5 | 140 |  |  |  |
|  | 75 | 87 |  |  |  |
|  | 100 | 50 |  |  |  |
|  | 125 | 38 |  |  |  |

Test Conditions 200 ml sludge volume
Mix 15 sec at 500 rpm.
Polymer Concentration=0.5% Active
Vacuum=15 in Hg.
Funnel=95 cm³
Filter=Whatman #4
pH=7.5
Solids=3.83%
The polymer treatments used in Example 2 were as follows:

(1) Treatment "B"
(2) Treatment "A"
(3) Treatment "E" Praestol 423 available from Stockhausen with an intrinsic viscosity of 7.74 dl/g @ 30° C. and 1 M NaCl; structure=

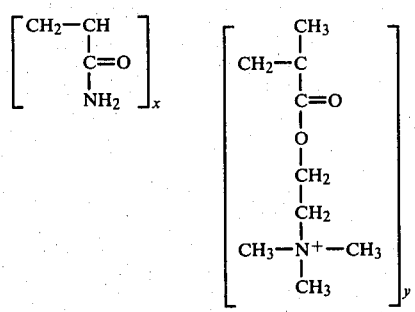

x=50 mole %
y=50 mole %
(4) Treatment "F"="Hercufloc 859" (Hercules Inc.); structure=

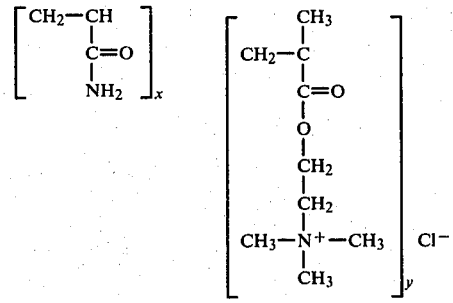

Wherein y=50 mole %.
Wherein x=50 mole %.

(5) Treatment "D"

Another test which is commonly employed to gauge sludge dewatering efficacy is the Capillary Suction Test. In accordance with this test, a small portion of sludge is placed in a cylindrical cell that is sitting on top of a piece of filter paper. The capillary pressure on the filter paper draws the water out of the sludge. A timer records the time (in seconds) required for the water to pass between two fixed points. Shorter times, of course, indicate better dewatering efficacy. In most cases, it is advisable that a graph (Capillary Suction Time vs. dosage) be made to evaluate the data. Generally, the lowest dosage which gives a low CST value is the optimal dosage.

Example 3

Thickened Biosludge from a Philadelphia refinery was subjected to the Capillary Suction Test. The polymers tested are listed hereinbelow. The results appear in FIGS. 2 and 3 and the data used to generate the figures is found in Table 3.

TABLE III

1. FIG. 2.

| Treatment | Capillary Suction Time - Seconds for Active Polymer Dosage (mg/L) | | | | | |
|---|---|---|---|---|---|---|
| | 100 mg/L | 150 mg/L | 200 mg/L | 250 mg/L | 300 mg/L | 350 mg/L |
| A | 193.5 | 43.5 | 27.0 | 18.0 | 12.6 | 15.0 |
| G | 228.9 | 68.8 | 37.3 | 28.4 | 12.0 | 15.6 |
| $G_1$ | 184.2 | 105.1 | 45.5 | 33.4 | 32.3 | 28.6 |

Blank = 781 seconds

2. FIG. 3.

| Treatment | Capillary Suction Time (Seconds) for Active Polymer Dosages (mg/L) | | | | | | | | |
|---|---|---|---|---|---|---|---|---|---|
| | 75 | 100 | 150 | 200 | 250 | 275 | 300 | 350 | 375 |
| A | 196.2 | 112.3 | 32.0 | 18.2 | 16.2 | 19.4 | 19.9 | 20.0 | — |
| B | — | 190.7 | 100.1 | 31.7 | 20.5 | — | 16.5 | 20.9 | — |
| D | — | 195.9 | 80.0 | 36.2 | 21.6 | — | 11.9 | 15.1 | — |
| F | — | 349.7 | 146.9 | 82.3 | 36.4 | — | 16.5 | 12.0 | 13.2 |

Blank = 689 seconds

Test Conditions

Figure 2:
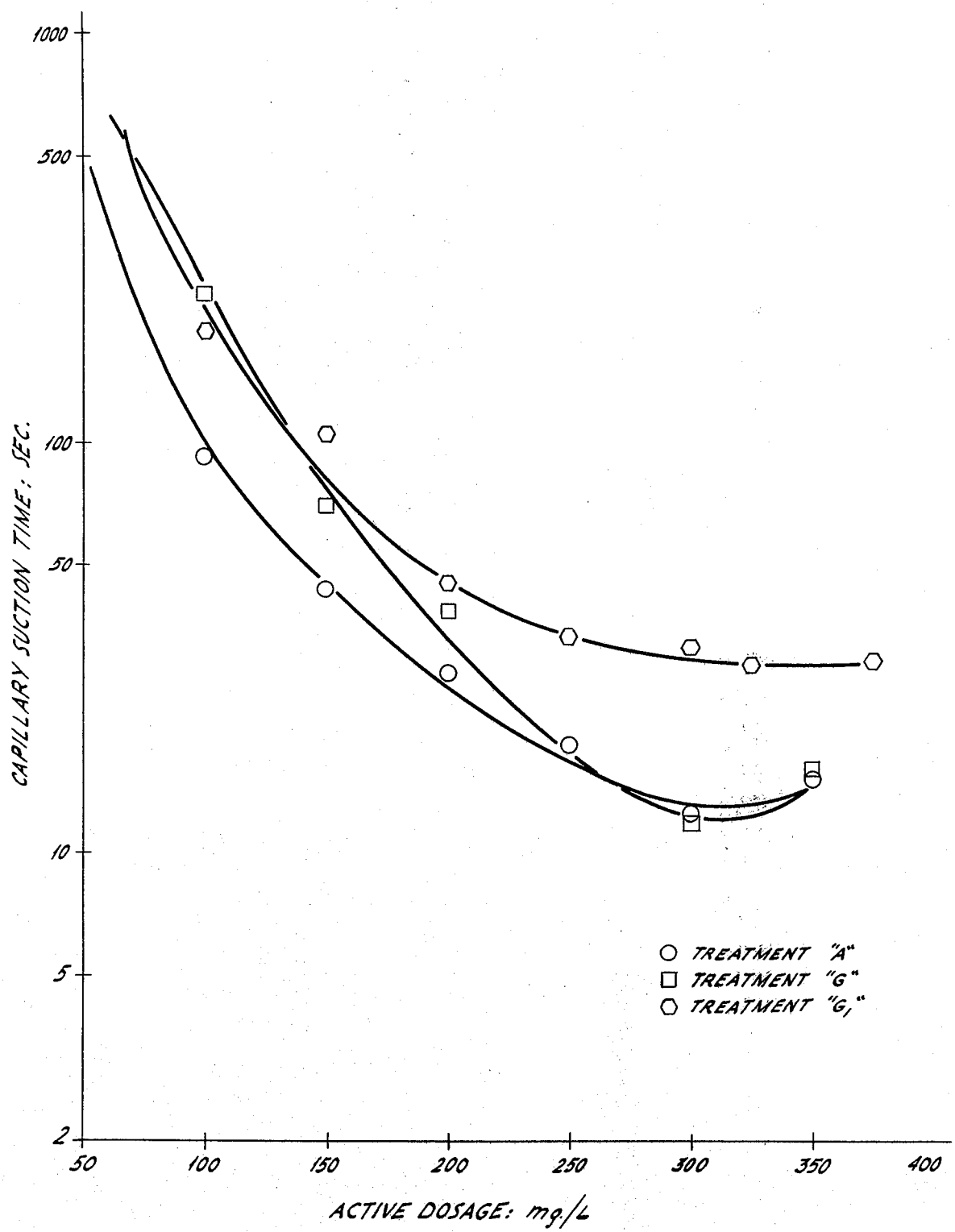
FIG. 2 is a graph showing the capillary suction times of various conditioned sludge samples tested in Example 3.
Figure 3:
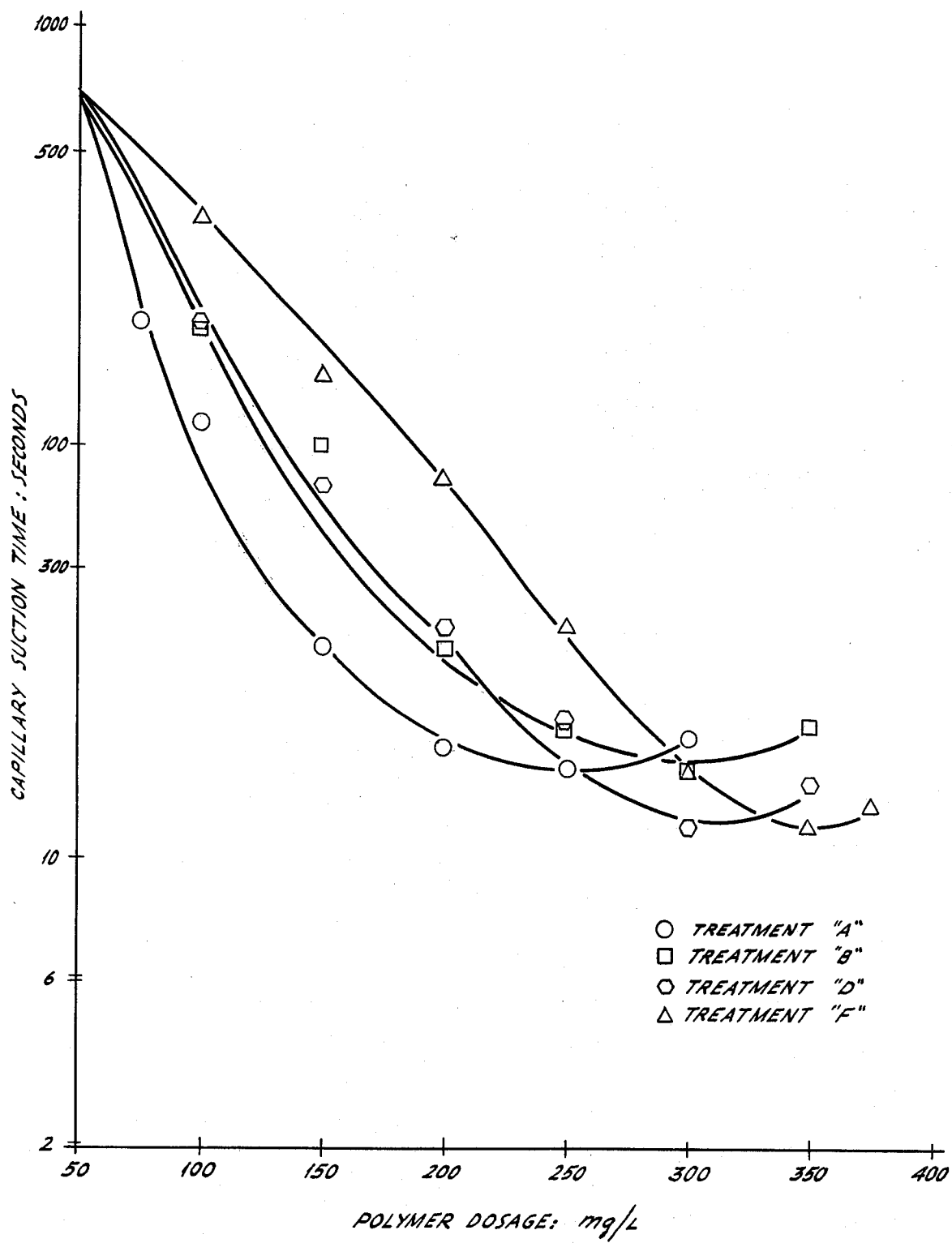
FIG. 3 is a graph showing the capillary suction times of the other conditioned sludge samples tested in Example 3.

1. FIG. 2
 (a) Mixing 20 sec at 500 rpm
 (b) Solids = 6.13%
 (c) pH = 6.5
2. FIG. 3
 (a) Mixing 20 sec at 500 rpm
 (b) Solids = 5.56%
 (c) pH = 6.7

FIG. 2.

(1) Treatment "A"
(2) Treatment "G" = homopolymer of

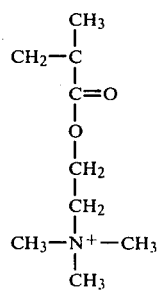

sold by Sanyo Chemical Co.; trademark Sanfloc C-009P.

FIG. 3.

(1) Treatment "A"
(2) Treatment "B"
(3) Treatment "D"
(4) Treatment "F"

Example 4

Figure 4:
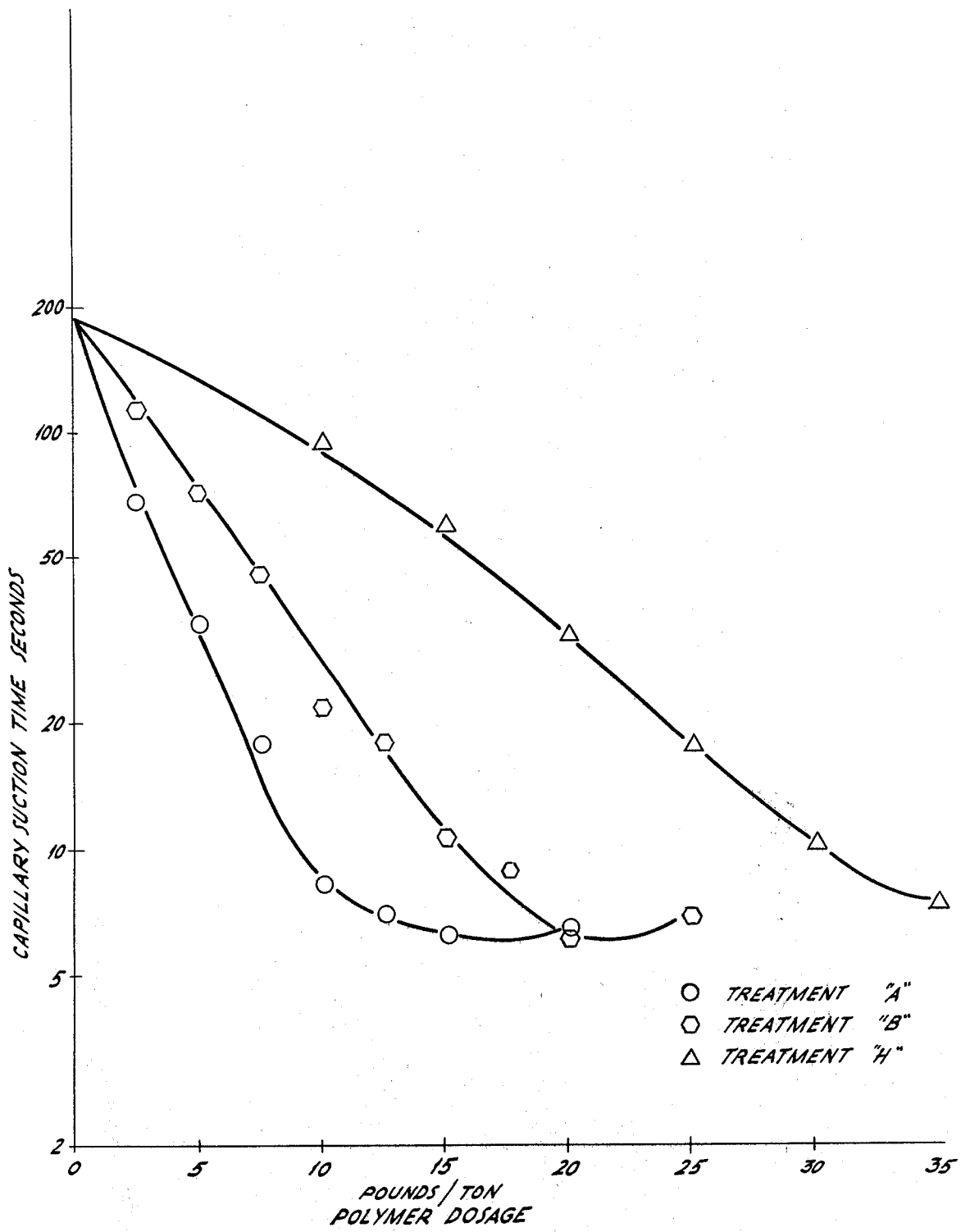
FIG. 4 is a graph showing the capillary suction times of the other conditioned sludge samples tested in Example 4.

Waste biological sludge from an Ohio facility was evaluated by means of the Capillary Suction Test. The results of this test appear below in Table IV and in FIG. 4.

TABLE IV

| Treatment | Dosage lb/ton | Capillary Suction Time Seconds |
|---|---|---|
| A | 2.5 | 66 |
| | 5.0 | 34 |
| | 7.5 | 18 |
| | 10 | 8.2 |
| | 12.5 | 7.0 |
| | 15 | 6.1 |
| B | 20 | 6.4 |
| | 2.5 | 112 |
| | 5.0 | 71 |
| | 7.5 | 44 |
| | 10 | 21 |
| | 12.5 | 18 |
| | 15 | 10.5 |
| | 17.5 | 8.8 |
| | 20 | 6.0 |
| | 25 | 6.8 |
| H | 10 | 94 |
| | 15 | 58 |
| | 20 | 33 |
| | 25 | 17.5 |
| | 30 | 10 |
| | 35 | 7.2 |
| Blank | — | 181 |

Test Conditions

Mixing 15 seconds at 500 rpm
Solids = 0.5%
pH = 7.7

The polymer treatments used in this test were as follows:

(1) Treatment "A"
(2) Treatment "B", same as Example 1.
(3) Treatment "H" Hercufloc 849, available from Hercules.

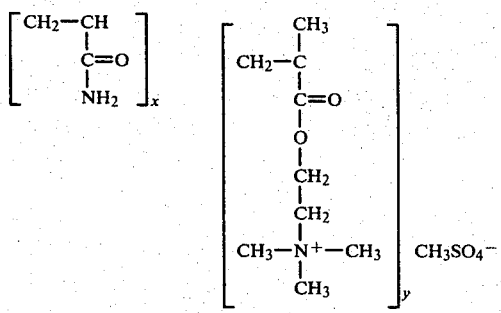

Wherein y=5 mole %.
Wherein x=95 mole %.
Intrinsic Viscosity, 6.22 dl/g @ 30° C. in 1 M NaCl.

Example 5

Figure 5:
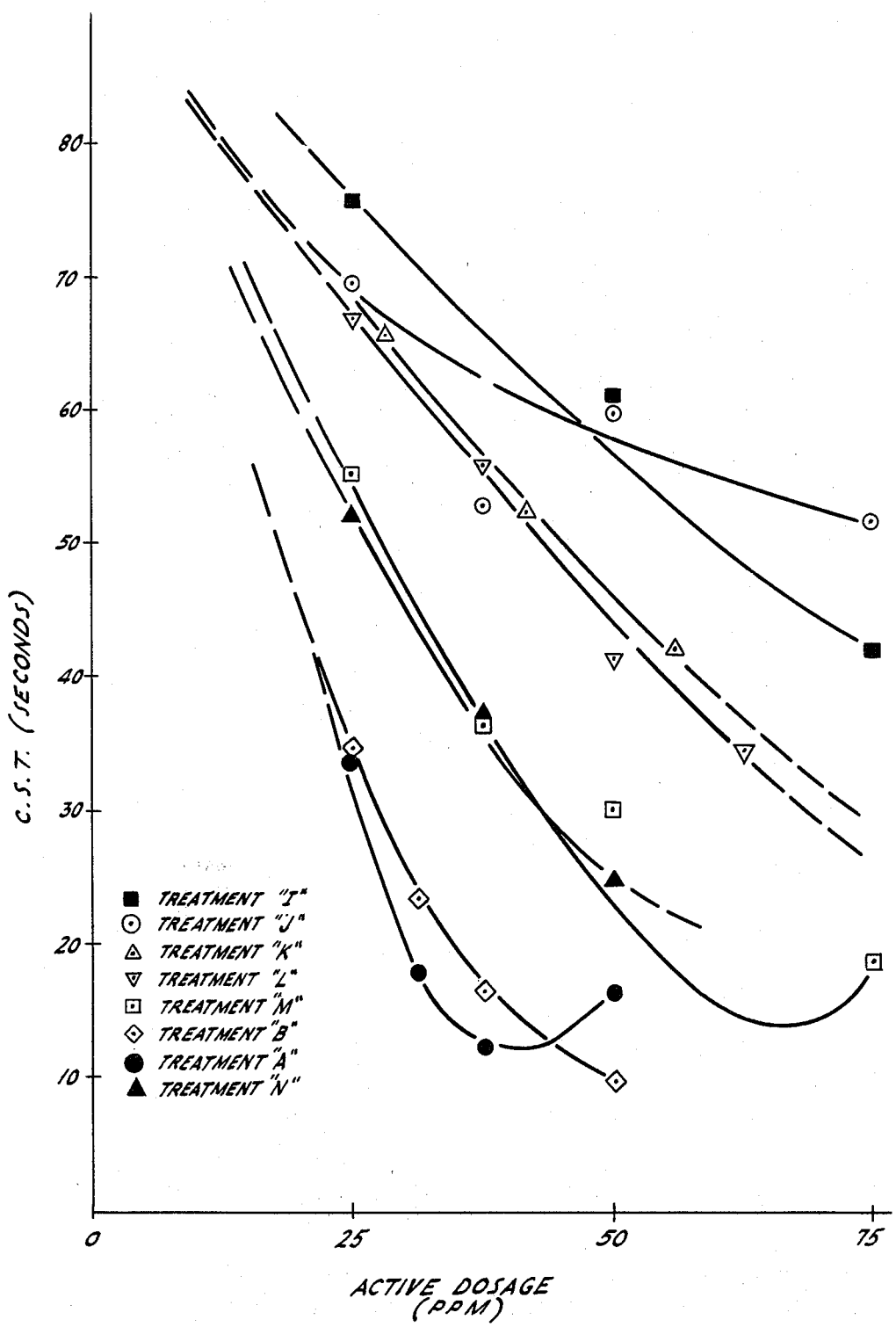
FIG. 5 is a graph showing the capillary suction times of the conditioned sludge samples tested in Example 5.

Waste activated sludge from a Pennsylvania facility was subjected to the Capillary Suction Test. The results appear in Table V and have been plotted in graph form in FIG. 5.

TABLE V

| Treatment | Polymer Dosage ppm - Active | Capillary Suction Time Seconds |
|---|---|---|
| Blank | — | 121 |
| I | 25 | 75.3 |
|  | 50 | 61.0 |
|  | 75 | 42.0 |
| J | 25 | 69.4 |
|  | 37.5 | 52.6 |
|  | 50 | 59.7 |
|  | 75 | 51.7 |
|  | 100 | 40.2 |
|  | 125 | 41.7 |
| K | 28 | 65.6 |
|  | 42 | 52.2 |
|  | 56 | 42.1 |
|  | 84 | 32.1 |
| L | 25 | 66.8 |
|  | 37.5 | 55.9 |
|  | 50 | 41.2 |
|  | 62.5 | 34.6 |
| M | 25 | 55.0 |
|  | 37.5 | 36.2 |
|  | 50 | 30.0 |
|  | 62.5 | 13.2 |
|  | 75 | 18.8 |
| B | 25 | 34.8 |
|  | 31.2 | 23.3 |
|  | 37.5 | 16.4 |
|  | 50 | 9.6 |
| A | 25 | 34.9 |
|  | 31.2 | 17.6 |
|  | 37.5 | 12.4 |
|  | 50 | 16.3 |
| N | 12.5 | 65.6 |
|  | 25 | 52.1 |
|  | 37.5 | 37.4 |
|  | 50 | 24.9 |
|  | 75 | 40.9 |

Test Conditions
pH=8.5
% Solids=0.571

The polymers used in this example were as follows:
(1) Treatment "I" Hercufloc 812=available from Hercules.

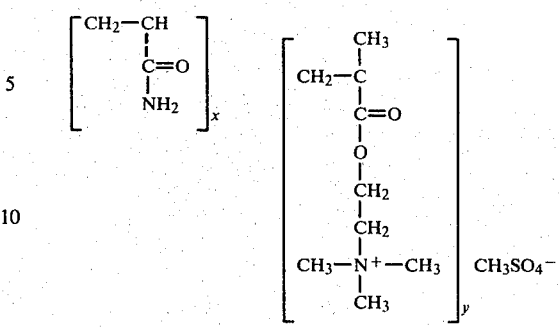

Wherein x=97 mole %.
Wherein y=3 mole %.
Intrinsic Viscosity, 4.62 dl/g @ 30° C. in 1 M NaCl.
(2) Treatment "J"= structure: 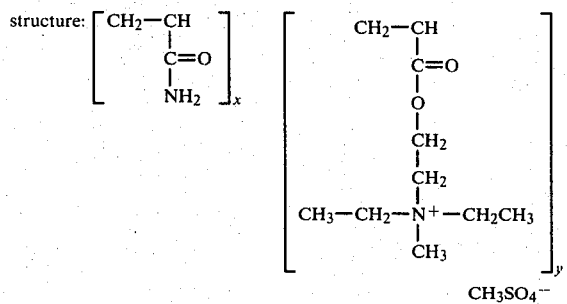

wherein
x=95 mole %
y=5 mole %
Intrinsic Viscosity, 10.6 dl/g @ 30° C. in 1 M NaCl.
(3) Treatment "K"=

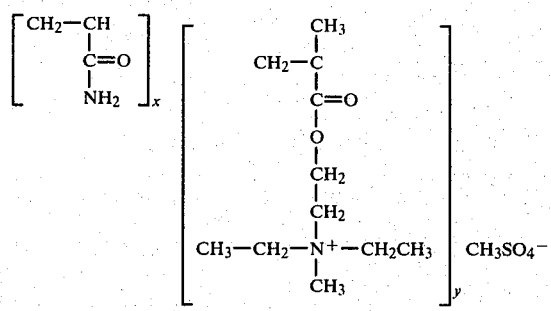

Wherein y=10 mole %.
Wherein x=90 mole %.
Intrinsic Viscosity 7.89 dl/g @ 30° C. in 1 M NaCl.
(4) Treatment "L" same as Treatment "A" but wherein y=10 mole %, commercially available from Sanyo Chemical; trademark Sanfloc C-909P; Intrinsic Viscosity 9.16 dl/g @ 30° C. in 1 M NaCl.
(5) Treatment "M" same as Treatment "A" but wherein y=20 mole %, commercially available from Sanyo Chemical; trademark Sanfloc C-809P; Intrinsic Viscosity 8.58 dl/g @ 30° C. in 1 M NaCl.
(6) Treatment "B" same as Treatment "A" but wherein y=60 mole %, commercially available from Sanyo Chemical; trademark Sanfloc C-509P.
(7) Treatment "A"

(8) Treatment "N"=Sanfloc CH-839-P available Sanyo Chemical; structure=same as "A" but wherein x=83 mole % and y=17 mole %.

Example 6

Figure 6:
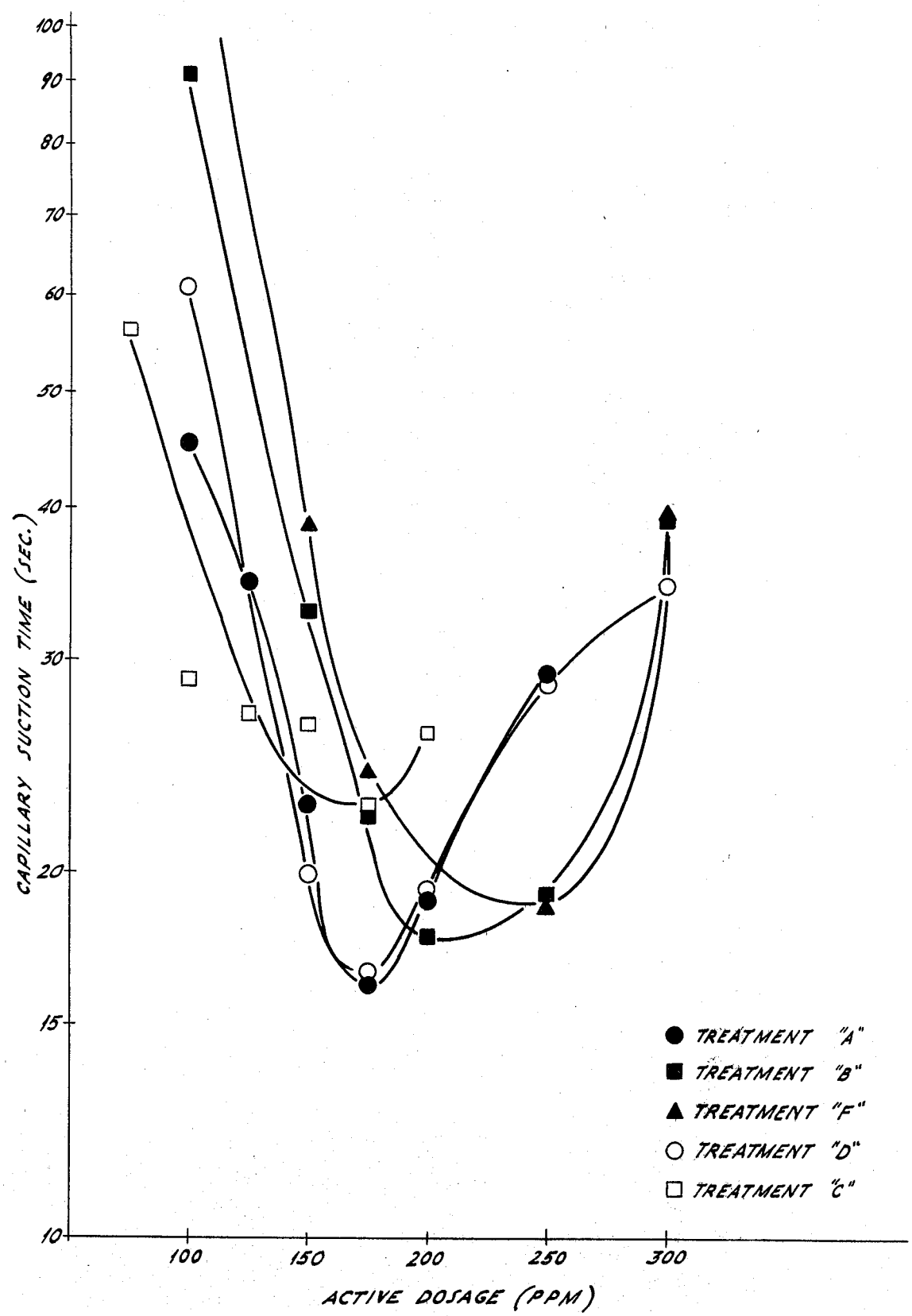
FIG. 6 is a graph showing the capillary suction times of the conditioned sludge samples tested in Example 6.

Sludge from a New Jersey waste treatment plant was subjected to the Capillary Suction Test. The results of this test appear in Table VI and in FIG. 6.

Test Conditions

Solids=3.7%
pH=5.5

TABLE VI

| Treatment | Polymer Dosage ppm - Active | Capillary Suction Time Seconds |
|---|---|---|
| A | 100 | 45.7 |
|   | 125 | 34.9 |
|   | 150 | 22.7 |
|   | 175 | 16.2 |
|   | 200 | 19.0 |
|   | 250 | 29.1 |
| B | 100 | 91.2 |
|   | 150 | 32.9 |
|   | 175 | 22.1 |
|   | 200 | 17.6 |
|   | 250 | 19.2 |
|   | 300 | 39.2 |
| F | 100 | 168 |
|   | 150 | 38.8 |
|   | 175 | 24.2 |
|   | 200 | 24.0 |
|   | 250 | 18.8 |
|   | 300 | 39.5 |
| D | 100 | 60.2 |
|   | 150 | 19.9 |
|   | 175 | 16.6 |
|   | 200 | 19.3 |
|   | 250 | 28.7 |
|   | 300 | 34.1 |
| Blank | — | 7600 |

The polymeric treatments used in this test were as follows:
(1) Treatment "A"
(2) Treatment "B"
(3) Treatment "F"
(4) Treatment "D"
(5) Treatment "C"

Example 7

Sludge from a New Jersey holding lagoon was subjected to the Capillary Suction Test. The results of this test are reported hereinbelow in Table 7 and appear graphically in FIG. 8.

TABLE VII

| Treatment | Polymer Dosage mg/L - Active | Capillary Suction Time Seconds |
|---|---|---|
| D | 100 | 99.5 |
|   | 150 | 58.6 |
|   | 175 | 46.2 |
|   | 200 | 33.1 |
|   | 250 | 39.2 |
| C | 50 | 106 |
|   | 100 | 51.2 |
|   | 150 | 19.4 |
|   | 200 | 49.3 |
| A | 50 | 198 |
|   | 100 | 42.5 |
|   | 125 | 20.3 |
|   | 150 | 8.5 |
|   | 175 | 7.2 |
|   | 200 | 9.5 |
| B | 100 | 115 |
|   | 150 | 47.2 |
|   | 200 | 27.3 |
|   | 225 | 22.5 |
|   | 250 | 9.7 |
|   | 300 | 10.5 |
| F | 75 | 158 |
|   | 100 | 85.2 |
|   | 125 | 54.3 |
|   | 150 | 15.2 |
|   | 200 | 13.4 |
|   | 250 | 13.2 |
|   | 275 | 15.0 |

The polymers used for this test were as follows:
(1) Treatment "D"
(2) Treatment "C"
(3) Treatment "A"
(4) Treatment "B"
(5) Treatment "F"

It is apparent from review of the examples that the copolymer of acrylamide/dimethylaminoethylmethacrylate methylchloride (90% mole percent cationic monomer Treatment "A") exhibits surprisingly superior dewatering results when compared to the other tested polyelectrolytes. It has been found that this particular polymer produces the very large floc necessary for good sludge dewatering, especially in belt filter operations.

At one test site, this particular polymer was the only one tested that could provide proper operation of the belt filter press, in that, its use did not bind the filter cloth, and the resulting cake solids did not have to be scraped off the filter cloth. This superior behavior was not to be expected from a polymer of such high cationic monomer content. Due to the high cationic monomer content, the molecular weight of this polymer is considerably lower than those of the majority of commercial acrylamide, cationic monomer copolymers generally considered to be excellent sludge dewatering aids. These commercial products usually contain a cationic monomer content of about 30-40 mole percent.

Although applicant is not to be bound by any particular theory of operation of the invention, it appears that in biological sludge dewatering neutralization of the sludge charge via 90% cationic monomer content is most important and is indeed more important than the molecular weight of the copolymer treatment. Surprisingly, when a 100% cationic charge density treatment was used (Example 3—Treatment G) the dewatering results fall far short when compared to the treatment of the present invention.

In accordance with the patent statutes, the best mode of practicing the invention has been herein set forth. However, it will be apparent to those skilled in the art that many modifications can be made in the methods herein disclosed without departing from the spirit of the invention. It is to be understood that the scope of the invention is to be limited solely by the scope of the appended claims.

I claim:

1. Method of treating organic sludge of the type which has been treated to increase biological growth therein, comprising adding to said sludge an effective amount of a copolymer flocculant treatment, said copolymer consisting essentially of an acrylamide monomer and a cationic monomer, said cationic monomer comprising a quaternary ammonium salt of N,N dimethylaminoethylmethacrylate, wherein said cationic monomer is present in said copolymer in a molar ratio of about 80–90% cationic monomer: 20–10% acrylamide, said copolymer having a molecular weight of at least about one million, said method further comprising the step of dewatering said sludge.

2. Method as defined in claim 1 wherein said copolymer comprises an acrylamide/dimethylaminoethylmethacrylate methylchloride polymer.

3. Method as defined in claim 1 comprising adding said copolymer to said sludge in an amount of about 5 to 50 lbs per ton of sludge.

4. Method as defined in claim 3 wherein said copolymer has a molecular weight of between about 1 to about 2 million.

5. Method as defined in claim 1 wherein said dewatering comprises processing said sludge in a belt filter mechanism.

6. Method as defined in claim 1 wherein said dewatering comprises processing said sludge in a vacuum filter mechanism.

7. Method as defined in claim 1 wherein said dewatering comprises processing said sludge in a centrifuge.

8. Method as defined in claim 1 wherein said dewatering comprises placing said sludge in a lagoon.

9. Method of treating organic sludge of the type which has been treated to increase biological growth therein, comprising adding to said sludge an effective amount of a copolymer flocculant treatment, said copolymer consisting essentially of an acrylamide monomer and a cationic monomer, said cationic monomer comprising a quaternary ammonium salt of N,N dimethylaminoethylmethacrylate, wherein said cationic monomer is present in said copolymer in a molar ratio of about 80–90% cationic monomer: 20–10% acrylamide, said copolymer having an intrinsic viscosity of at least about 5 dl/g @ 30° C. in 1 M NaCl, said method further comprising the step of dewatering said sludge.

* * * * *

UNITED STATES PATENT OFFICE
CERTIFICATE OF CORRECTION

Patent No. 4,396,513                     Dated  August 2, 1983

Inventor(s)  David R. Haldeman

Figure 8:
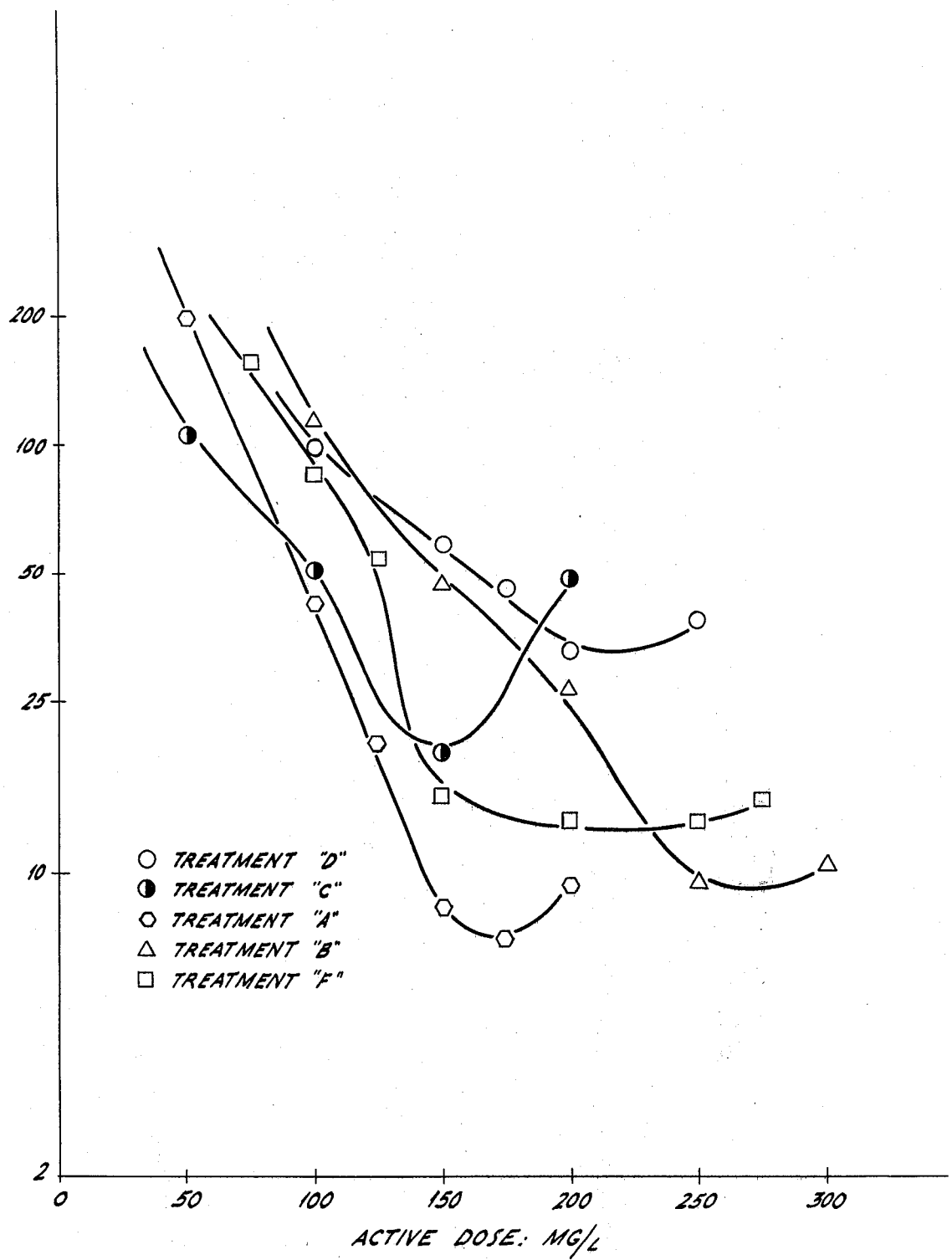
FIG. 8 is a graph showing the capillary suction times of the conditioned sludge samples tested in Example 7.

It is certified that error appears in the above-identified patent and that said Letters Patent are hereby corrected as shown below:

In Figure 8 (Sheet 8 of 8) please add the following as a label for the "y" axis of the graph:

"Capillary Suction Time (Sec.)"

In Column 7, line 21, please change "3" to --- III ---.

In Column 11, line 49, please change "7" to --- VII ---.

Signed and Sealed this

Twentieth Day of December 1983

[SEAL]

Attest:

GERALD J. MOSSINGHOFF

Attesting Officer

Commissioner of Patents and Trademarks